US011953166B2

(12) United States Patent
Rizzo

(10) Patent No.: US 11,953,166 B2
(45) Date of Patent: Apr. 9, 2024

(54) LED LIGHTING FIXTURE WITH INTERCONNECT

(71) Applicant: Molex, LLC, Lisle, IL (US)

(72) Inventor: Gilberto Rizzo, Milan (IT)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/779,555

(22) PCT Filed: Nov. 24, 2020

(86) PCT No.: PCT/US2020/062015
§ 371 (c)(1),
(2) Date: May 25, 2022

(87) PCT Pub. No.: WO2021/108406
PCT Pub. Date: Jun. 3, 2021

(65) Prior Publication Data

US 2023/0023096 A1 Jan. 26, 2023

Related U.S. Application Data

(60) Provisional application No. 62/939,705, filed on Nov. 25, 2019.

(51) Int. Cl.
*F21S 4/28* (2016.01)
*F21S 2/00* (2016.01)
(Continued)

(52) U.S. Cl.
CPC ................. *F21S 4/28* (2016.01); *F21S 2/005* (2013.01); *F21V 17/101* (2013.01);
(Continued)

(58) Field of Classification Search
CPC .. F21Y 2103/10; F21Y 2115/00; F21V 23/06; F21V 15/015; F21S 2/005; F21S 4/28; H01R 33/00
See application file for complete search history.

(56) References Cited

U.S. PATENT DOCUMENTS 7,331,687 B1 * 2/2008 Noh .......................... F21S 4/20 362/217.05
7,695,302 B2 4/2010 Eissner et al.
(Continued)

FOREIGN PATENT DOCUMENTS

CN 203836644 U 9/2014
CN 207921795 U 9/2018
(Continued)

OTHER PUBLICATIONS

EC&M, "NEC Rules for Installing Lighting on Circuits Greater than 30V", Retrieved from Internet URL: https://www.ecmweb.com/national-electrical-code/code-basics/article/20897204/NEC-rules-for-installing-lighting-on-circuits-greater-than-30v, Jan. 16, 2013, 18 Pages.
(Continued)

*Primary Examiner* — Anabel Ton

(57) ABSTRACT

An assembly includes first and second light emitting diode (LED) lighting fixtures. Each LED lighting fixture includes an enclosure, a heat sink disposed in the enclosure, a LED array mounted on the heat sink, and a connector attached to a first end of the enclosure. The connector of the first LED lighting fixture is a male connector, and the connector of the second LED lighting fixture is a female connector. The male connector is configured to directly mate with the female connector without the use of tools.

20 Claims, 7 Drawing Sheets

(51) Int. Cl.

| | |
|---|---|
| ***F21V 17/10*** | (2006.01) |
| ***F21V 21/005*** | (2006.01) |
| ***F21V 23/06*** | (2006.01) |
| *F21Y 103/10* | (2016.01) |
| *F21Y 115/10* | (2016.01) |

(52) U.S. Cl.
CPC ............ *F21V 21/005* (2013.01); *F21V 23/06* (2013.01); *F21Y 2103/10* (2016.08); *F21Y 2115/10* (2016.08)

(56) References Cited

U.S. PATENT DOCUMENTS

| | | | | |
|---|---|---|---|---|
| 7,695,322 | B2 | 4/2010 | Clyatt | |
| 9,651,225 | B2 | 5/2017 | Purdy | |
| 10,352,550 | B1 | 7/2019 | Olsson et al. | |
| 2010/0053956 | A1* | 3/2010 | Park ........................ | H05K 1/142 362/373 |
| 2012/0002417 | A1* | 1/2012 | Li ............................. | F21S 4/28 362/249.02 |
| 2014/0071668 | A1* | 3/2014 | Ai ......................... | F21V 19/009 362/217.17 |
| 2015/0159848 | A1 | 6/2015 | Sieberth et al. | |
| 2015/0176770 | A1 | 6/2015 | Wilcox et al. | |
| 2015/0260383 | A1 | 9/2015 | Wilcox | |
| 2018/0003351 | A1* | 1/2018 | Van Winkle ............ | F21V 23/04 |
| 2018/0292055 | A1 | 10/2018 | Moioli et al. | |

FOREIGN PATENT DOCUMENTS

| | | | |
|---|---|---|---|
| CN | 110285346 | A | 9/2019 |
| KR | 20100094906 | A | 8/2010 |
| WO | 2014017068 | A1 | 1/2014 |

OTHER PUBLICATIONS

International Preliminary Report on Patentability received for PCT Application No. PCT/US2020/062015, dated Jun. 9, 2022, 07 Pages.

International Search Report and Written Opinion received for PCT Application No. PCT/US2020/062015, dated Mar. 15, 2021, 08 Pages.

Lumicrest Lighting Solution, “EasyLinx UnderCabinet & Modular LED Bar”, Retrieved on Dec. 5, 2018, 03 Pages.

Shop! Retail Environments , “Specialty Lighting: Edge”, Aug. 7, 2018, 07 Pages.

Solidrop, “20Pcs/lot 2 Pin 200 Mm T4 T5 Led Tube Connector Cable Wire Double-End For T4 T5 T8 Led Lamp Lighting Connection” Retrieved on Dec. 5, 2018, 07 Pages.

* cited by examiner

LED LIGHTING FIXTURE WITH INTERCONNECT

RELATED APPLICATIONS

This application is a national phase of PCT/US2020/062015, filed on Nov. 24, 2020, which claims priority to U.S. Provisional Application No. 62/939,705, filed on Nov. 25, 2019, which are incorporated herein by reference in their entireties.

FIELD OF THE DISCLOSURE

This invention relates to lighting and, more particularly, to light emitting diode (LED) illumination as well as tubular lighting LED lighting fixtures.

DESCRIPTION OF RELATED ART

Light emitting diode (LED) lighting systems are becoming more prevalent as replacements for older lighting systems. LED lighting systems are an example of solid state lighting (SSL) and have advantages over traditional lighting solutions, such as incandescent and fluorescent lighting, because LED lighting systems use less energy, are more durable, operate longer, can be combined in multi-color arrays that can be controlled to deliver virtually any color light, and generally contain no lead or mercury. A solid-state lighting system may take the form of a lighting unit, light LED lighting fixture, light bulb, or a "lamp."

LED lighting products which take the form of a linear tube which are used to replace fluorescent lighting typically comprise an array of LEDs mounted on one or more circuit boards. The circuit boards are mounted on an elongate heat sink formed of a heat conducting material, such as aluminum. The circuit boards are in thermal contact with the heat sink, but are electrically isolated from the heat sink. An internal driver module containing circuitry for converting AC line current to DC current and controlling the voltage applied to the LEDs is provided. The internal driver module can be designed specifically to meet the electrical requirements of the circuit boards, thus overcoming potential problems associated with using the existing local ballast originally designed for powering fluorescent lamps.

In some instances, multiple linear tubes are required to provide increased illumination. Certain individuals can appreciate an improved structure that allows greater illumination at a minimal increase in cost for such an arrangement.

BRIEF SUMMARY

The present disclosure is directed to a light emitting diode (LED) lighting LED lighting fixture that is a replacement for a fluorescent LED lighting fixture. LED lighting is particularly useful. LEDs offer many advantages over incandescent and fluorescent light sources, including lower energy consumption, longer lifetime, improved robustness, smaller size, faster switching, and excellent durability and reliability. LEDs emit more light per watt than incandescent light bulbs. LEDs can be tiny and easily placed on printed circuit boards. LEDs activate and turn on very quickly and can be readily dimmed. LEDs emit a cool light with very little infrared light. LEDs come in multiple colors which are produced without the need for filters. LEDs of different colors can be mixed to produce white light.

In some embodiments, an assembly includes first and second LED lighting fixtures. Each LED lighting fixture includes an enclosure, a heat sink disposed in the enclosure, an LED array mounted on the heat sink, and a connector attached to a first end of the enclosure. The connector of the first LED lighting fixture is a male connector, and the connector of the second LED lighting fixture is a female connector. The male connector is configured to directly mate with the female connector without the use of tools.

In some embodiments, an LED lighting fixture includes an enclosure formed of a tube which is at least partially optically transmissive. At least one LED is within the enclosure and is operable to emit light through the tube when energized through an electrical path. The at least one LED is mounted on a substrate, such as a circuit board. In some applications, additional lighting may be required. In such instances. additional LED lighting fixtures according to the present disclosure are installed to increase illumination. The LED lighting fixtures include a pluggable connector allowing multiple LED lighting fixtures to be connected together in an end-to-end arrangement. A first end of the LED lighting fixture includes a male connector, and a second end of the LED lighting fixture includes a female connector. The male connector of one LED lighting fixture is mateable with the female connector of a like LED lighting fixture. The connectors are configured such that a male connector is connected to the first end of the LED lighting fixture by a first adapter, and a female connector is connected to the second end of the LED lighting fixture by a second adapter. In this arrangement, multiple LED lighting fixtures may be connected together in liner fashion creating a modular arrangement of LED lighting fixtures.

BRIEF DESCRIPTION OF THE DRAWINGS

The present disclosure is illustrated by way of example, and not limited, in the accompanying figures in which like reference numerals indicate similar elements and in which.

DETAILED DESCRIPTION

The figures illustrate an embodiment of the present disclosure and it is to be understood that the disclosed embodiment is merely exemplary of the disclosure, which may be embodied in various forms. Therefore, specific details disclosed herein are not to be interpreted as limiting, but merely as a basis for the claims and as a representative basis for teaching one skilled in the art to variously employ the present disclosure.

Figure 1:
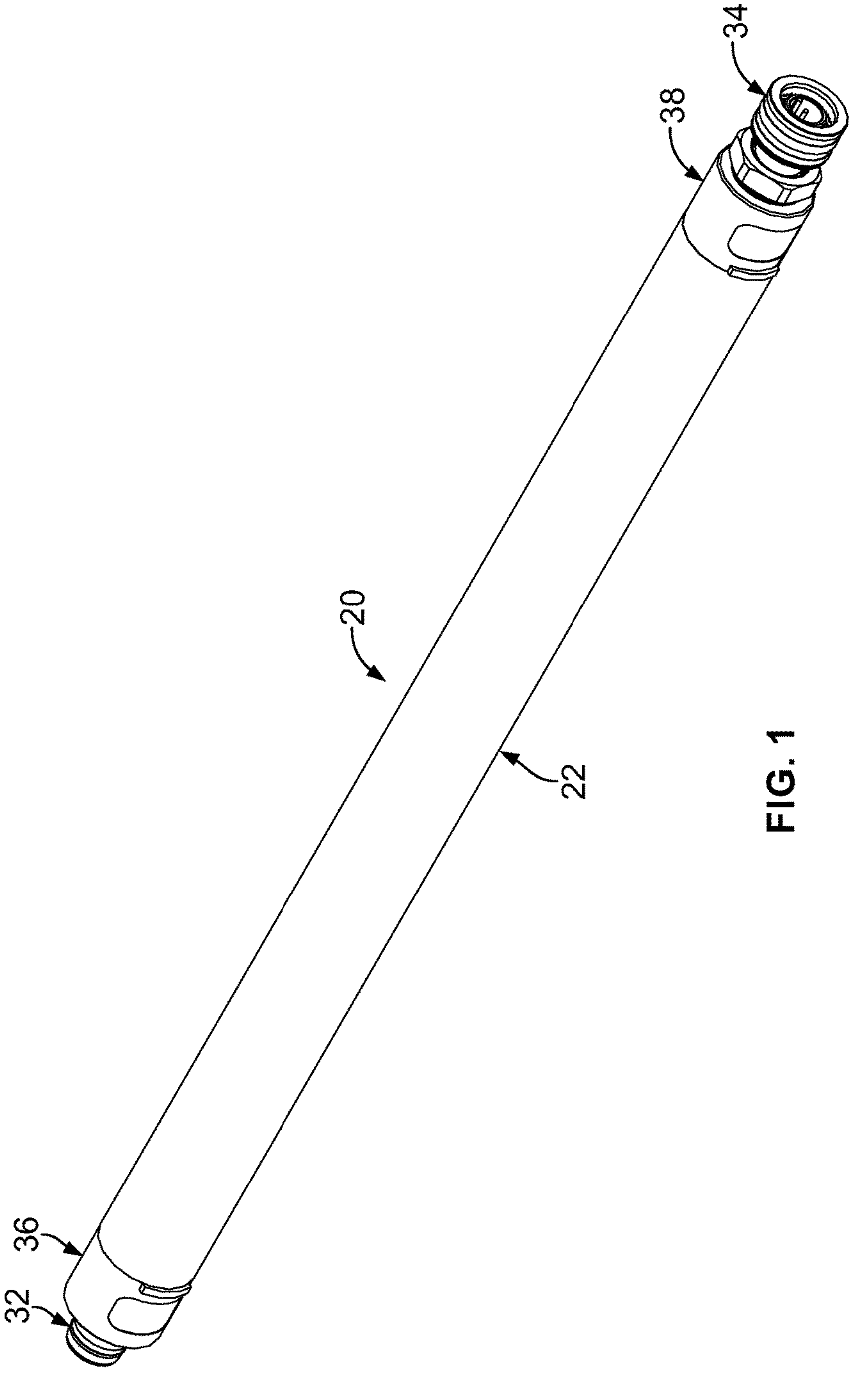
FIG. 1 depicts a perspective view of an embodiment of a light emitting diode lighting fixture.
Figure 3:
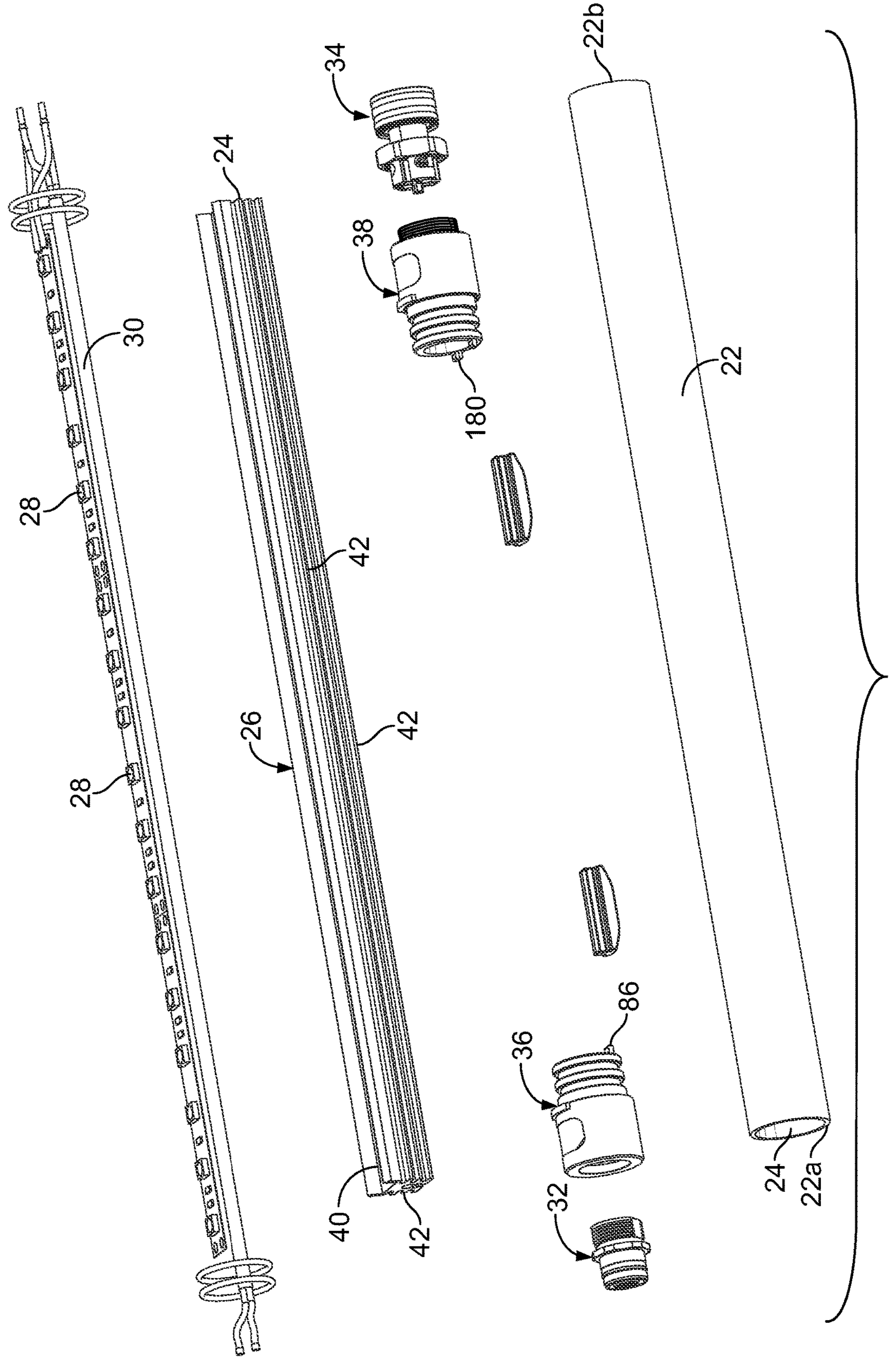
FIG. 3 depicts an exploded perspective view of the light emitting diode lighting fixture.

A light emitting diode (LED) lighting fixture 20, see FIG. 1, is provided as a replacement for a conventional fluorescent lighting typical of that found in both residential and industrial settings. In the embodiment shown in FIG. 3, the LED lighting fixture 20 includes an enclosure 22 having opposite ends 22*a*, 22*b* and a central passageway 24 defined by an inner wall therethrough, a heat sink 26 disposed within the passageway 24, an array of LEDs 28 mounted on a substrate 30, such as a circuit board, and which is in turn mounted on the heat sink 26, a female connector 32 attached to one of the ends, shown as end 22*a*, of the enclosure 22, and a male connector 34 attached to the end 22*b* of the enclosure 22. In an embodiment, the female connector 32 is attached to the end 22*a* of the LED lighting fixture 20 by a first adapter 36, see FIG. 4, and the male connector 34 is attached to the other one of the ends, shown as end 22*b*, of the LED lighting fixture 20 by a second adapter 38, see FIG. 5.

The enclosure 22 is at least partially optically transmissive to allow light to be radiated therethrough to illuminate the direct surrounding space. The enclosure 22 may be formed of plastic, such as polycarbonate. In an embodiment, the enclosure 22 is a tube having a cylindrical passageway 24 with open ends.

The heat sink 26 dissipates heat buildup from the LEDs 28 and from the substrate 30. The heat sink 26 includes a body having outer and inner opposite ends. A channel 40 extends between the ends in which the substrate 30 is seated. The heat sink 26 further includes a plurality of fins 42 extending between the ends. At least one LED 28 is provided on the substrate 30 and is operable to emit light through the enclosure 22 when energized through an electrical path.

The female connector 32 provides one half of an electrical connector, and the male connector 34 provides a second half of an electrical connector. The female and male connectors 32, 34 are configured to be coupled together without the use of tools. An example of suitable female and male connectors 32, 34 is provided in U.S. Pat. No. 7,695,302 B2 assigned to WOODHEAD INDUSTRIES, INC., ILLINOIS, which is hereby incorporated by reference in its entirety, and described herein. While the female and male connectors of U.S. Pat. No. 7,695,302 B2 provide an example, other electrical connectors may be provided so long as the electrical connector does not require tools to assemble the connector halves together.

Figure 6:
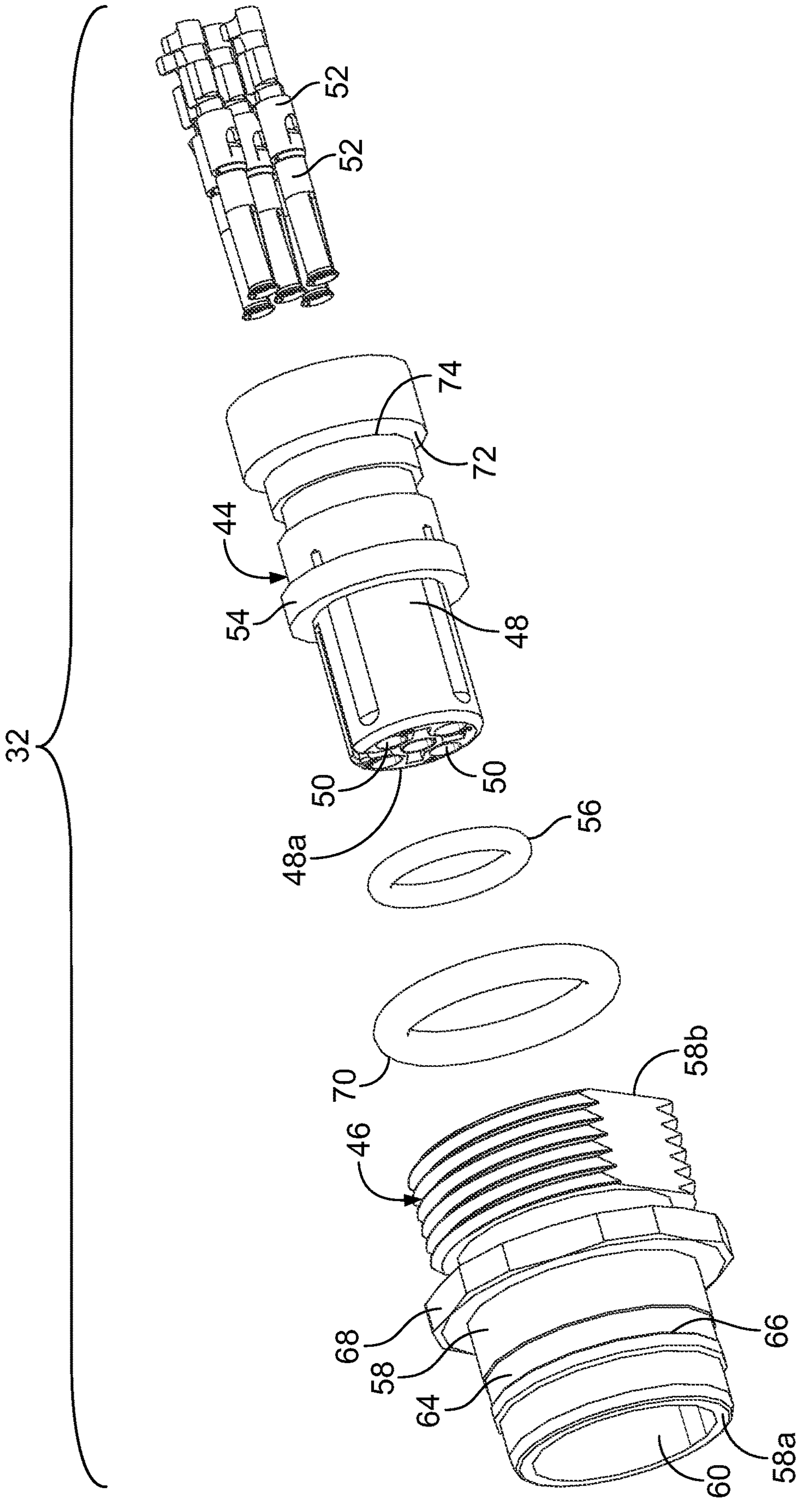
FIG. 6 depicts an exploded perspective view of a female connector of the light emitting diode lighting fixture.
Figure 7:
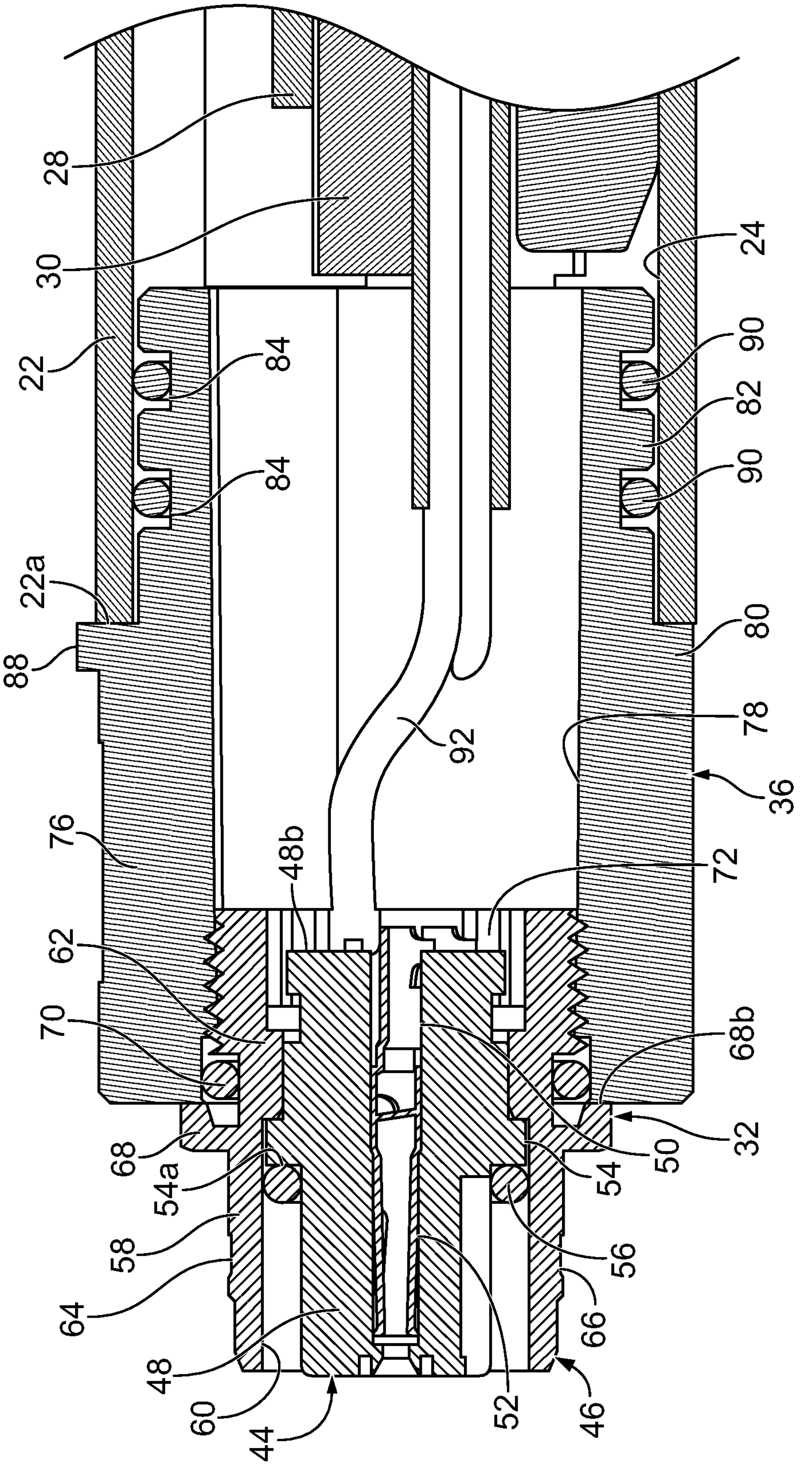
FIG. 7 is a partial cross-sectional view of the light emitting diode lighting fixture.

As best shown in FIGS. 6 and 7, the female connector 32 includes a terminal receiving member 44, and a receiving sleeve 46 in which the terminal receiving member 44 is mounted.

The terminal receiving member 44 has a cylindrical body 48 having outer and inner ends 48*a*, 48*b*, a plurality of spaced apart passageways 50 defined by inner walls therethrough, and terminal sleeves 52 mounted within the passageways 50. A flange 54 extends radially outward from the body 48 and may extend circumferentially around the body 48. A sealing member 56, such as a rubber O-ring is positioned proximate to an outer end 54*a* of the flange 54.

The receiving sleeve 46 is formed as a tube having a cylindrical body 58 with outer and inner ends 58*a*, 58*b*, and a cylindrical passageway 60 defined by an inner wall therethrough. A projection 62 extends radially inward from the wall forming the passageway 60 and extends circumferentially around the wall. A recess 64 is formed within the exterior of the body 58 and extends circumferentially therearound. The recess 64 is proximate to, but spaced from the outer end 58*a* of the body 58 and forms a forward shoulder 66. A collar 68, which may be L-shaped in cross-section, extends from the exterior surface of the body 58. A sealing member 70, such as a rubber O-ring is mounted proximate to an inner side 68*b* of the collar 68. The exterior surface of the body 58 extending from the inner end 58*b* may be threaded.

The terminal receiving member 44 seats within passageway 60 of the receiving sleeve 46, and the receiving sleeve 46 encircles the terminal receiving member 44 in a ring shape. The flange 54 on the terminal receiving member 44 engages with the projection 62 in the receiving sleeve 46 and the outer ends 48*a*, 58*a* align. A positioning member 72, having a receiving passageway 74 defined by an inner wall therethrough is seated within the passageway 60 of the receiving sleeve 46 and secures the terminal receiving member 44 and the receiving sleeve 46 together.

Figure 4:
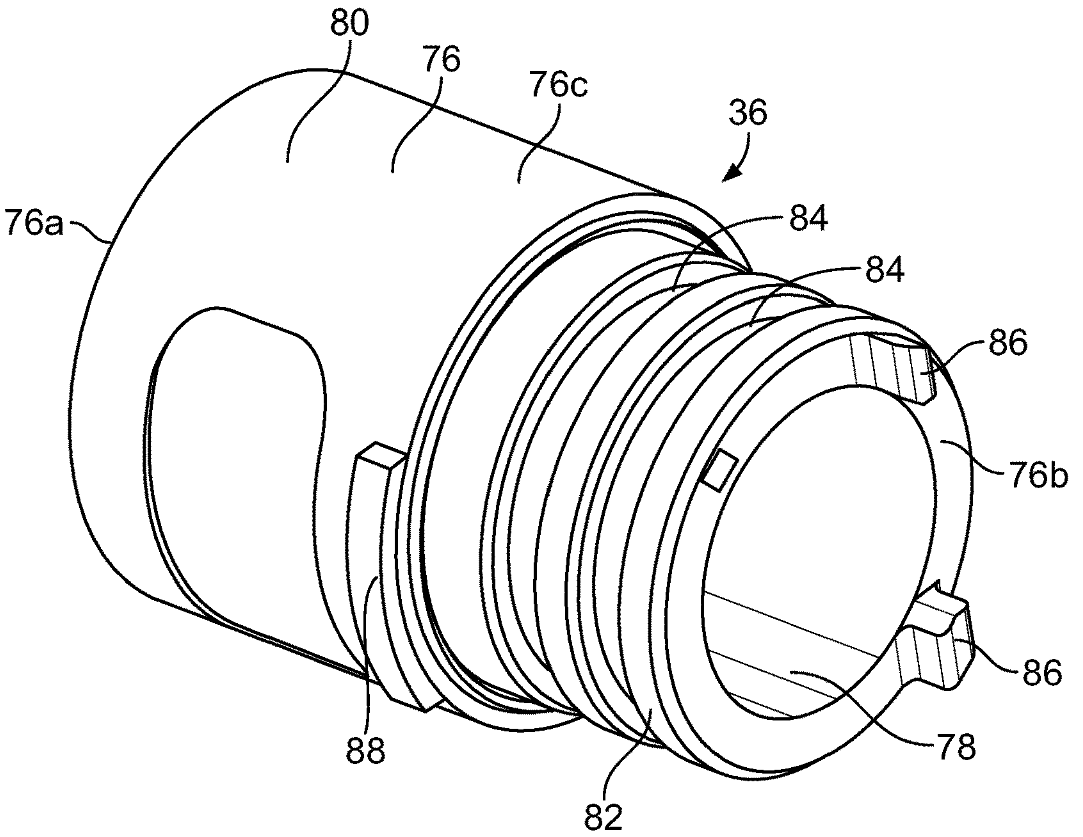
FIG. 4 is a perspective view of a first adapter of the light emitting diode lighting fixture.

The first adapter 36 is illustrated in FIG. 4. The first adapter 36 may be formed of plastic, such as polycarbonate, and includes a body 76 having outer and inner ends 76*a*, 76*b*, an outer surface 76*c*, and a central passageway 78 defined by an inner wall therethrough. The passageway 78 may be cylindrical. The body 76 has an outer section 80 extending from the outer end 76*a* to an inner section 82 which extends from the outer section 80 to the inner end 76*b*. The outer section 80 has an outer diameter, and the inner section 82 has an inner diameter which is less than the outer diameter. A pair of spaced apart grooves 84 are in the outer surface 76*c* of the inner section 82 and extend circumferentially therearound. At least one projection 86, shown as two projections in the drawings, extend from the inner end 76*b* of the body 76. The outer surface 76*c* of the outer section 80 may be cylindrical, with the exception of an ear 88 that extends radially outward therefrom proximate to the inner section 82. Threads may provided in the wall forming the passageway 78. Sealing members 90, such as rubber O-rings, are seated within the grooves 84. The first adapter 36 is attached to the end 22*a* of the enclosure 22 to form a mechanical attachment, and may be attached by a variety of processes, such as ultrasonic welding, adhesives, threads, clamps etc., with the sealing members 90 sandwiched between the first adapter 36 and the enclosure 22. This prevents the entrance of moisture into the enclosure 22 between the joint between the first adapter 36 and the enclosure 22.

An end of a wire lead 92 is connected to a contact pad on the substrate 30 and may be connected by soldering or welding. A second end of the wire lead extends through the passageway 78 of the first adapter 36 and is coupled to one of the terminal sleeves 52, for example by screw attach welding or by crimping. The first adapter 36 is attached to the enclosure 22 by inserting the outer section 80 through the end 22*a* and into the passageway 24. The ear 88 of the first adapter 36 engages the end 22*a* of the enclosure 22 to prevent the further insertion of the first adapter 36 into the enclosure 22. The sealing members 90 are sandwiched between the first adapter 36 and the enclosure 22 to prevent the entrance of moisture therebetween. Thereafter, the first adapter 36 and the enclosure 22 are permanently mated together, such as by, for example, ultrasonic welding.

The receiving sleeve 46 is inserted into the passageway 78 of the first adapter 36 and mated thereto. In an embodiment, the receiving sleeve 46 and the first adapter 36 are threadedly engaged with each other. The collar 68 abuts against the end 22*a* of the enclosure 22.

Figure 8:
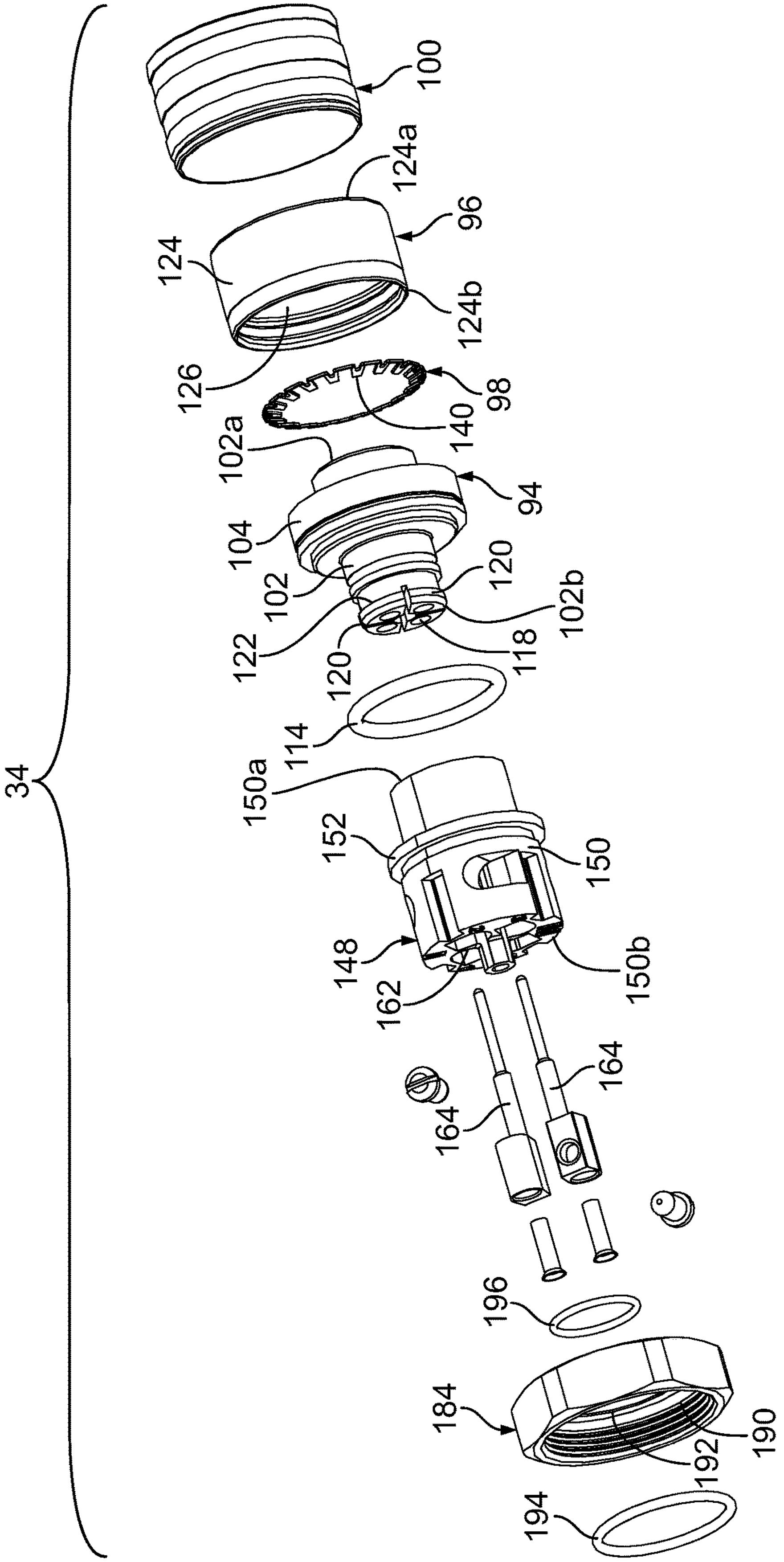
FIG. 8 depicts an exploded perspective view of a male connector of the light emitting diode lighting fixture.
Figure 9:
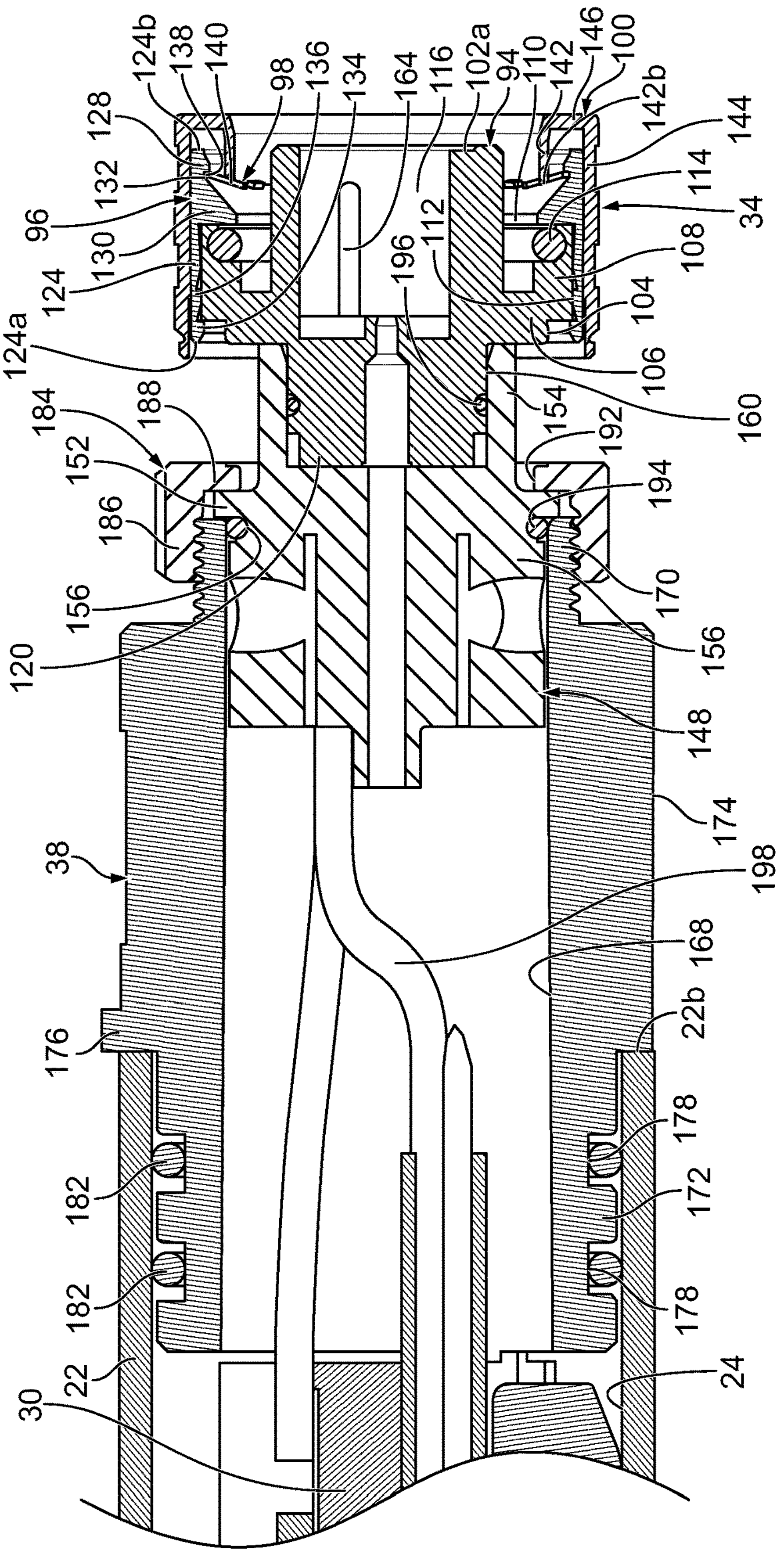
FIG. 9 is a partial cross-sectional view of the light emitting diode lighting fixture.

As best shown in FIGS. 8 and 9, the male connector 34 includes a plug member 94, a receiving sleeve 96 mounted on the plug member 94, a locking member 98 mounted on the receiving sleeve 96 and a sliding sleeve 100 mounted on the receiving sleeve 96.

The plug member 94 has a cylindrical body 102 having outer and inner ends 102*a*, 102*b*, and a collar 104 extending from the body. The collar 104 has a first leg 106 which extends radially outward from the body 102, and a second leg 108 which extends circumferentially around the body 102 to define a receiving space 110. A circumferential groove 112 is provided on an exterior surface of the second leg 108. A sealing member 114, such as a rubber O-ring, is mounted on an interior surface of the second leg 108 and may be mounted in a groove. A socket 116 extends from the outer end 102*a* of the body 102 to a plurality of spaced apart passageways 118 extending from the socket 116 to the inner end 102*b* of the body 102. A plurality of compressible fingers 120, each of which is separated from the adjacent finger 120 by a slot, are provided at the inner end 102*b* of the body 102. The fingers 120 can be compressed inwardly. Each finger 120 has a projection 122 extending radially outward therefrom and circumferentially around the finger 120.

The receiving sleeve 96 encircles the second leg 108 of the collar 104 in a ring shape. The receiving sleeve 96 has a cylindrical body 124 having outer and inner ends 124*a*, 124*b*, and a cylindrical passageway 126 defined by an inner wall therethrough. A barb 128 extends from the wall forming the passageway 126 proximate to the outer end 124*a*. A flange 130, having an angled outer surface, extends from the wall forming the passageway 126 at a position spaced from the barb 128. The barb 128 and the flange 130 form a groove 132 therebetween. Spaced apart barbs 134, 136 extend from the wall forming the passageway 126 proximate to the inner end 124*b* of the receiving sleeve 96.

The receiving sleeve 96 is fixedly mounted on the plug member 94. Barb 134 engages with an inner end 108*b* of the second leg 108, barb 136 seats within the groove 112, and an inner surface of the flange 130 engages with the outer end of the second leg 108 and extends radially inward to overlap the sealing member 114 in a longitudinal direction. While the plug member 94 and the receiving sleeve 96 are shown as separate components in the drawings, the plug member 94 and the receiving sleeve 96 may be unitary.

The locking member 98 is a spring ring having an outer ring 138 from which a plurality of locking lugs 140 project inwardly. The locking lugs 140 are spaced apart in the circumferential direction. The outer ring 138 seats within the groove 132 in the receiving sleeve 96 and extend inwardly into the receiving space 110. The locking lugs 140 are flexible with respect to the outer ring 138 so the locking lugs 140 may be displaced by sliding the release sleeve 100 between a locking position and an unlocking position as described in U.S. Pat. No. 7,695,302 B2. In the locking position, an inner cross-section defined by the locking lugs 140 is smaller than the inner cross-section defined by the locking lugs 140 in the unlocking position. The locking lugs 140 are inclined in the connect direction in the locking position at an angle. The movement of the individual locking lugs 140 into the unlocking position takes place against a restoring spring force of the outer ring 138, which exerts a biasing force on the sliding sleeve 100 to return it to a fixed rest position.

The sliding sleeve 100 encircles the receiving sleeve 96 in a ring shape. The sliding sleeve 100 has a substantially U-shaped profile in cross-section with two cylindrical walls 142, 144 of different axial lengths connected by an outer end wall 146 which extends transverse to the walls 142, 144. The shorter wall 142 forms an actuating section of the sliding sleeve 100 and is radially inward of the longer wall 144. The longer wall 144 is radially outward of the shorter wall 142 and forms a grip section of the sliding sleeve 100. The longer wall 144 can be manually engaged by a user. The sliding sleeve 100 is displaceably mounted on the receiving sleeve 96 for reciprocal sliding movement in a longitudinal direction. The shorter wall 142 has a free inner edge 142*b* which engages and interacts with the locking lugs 140. The coupling between the locking member 98 and the sliding sleeve 100 is made such that any shift of the sliding sleeve 100 into its release position forces the locking member 98 or its locking lugs 140 to expand into the release position.

The fingers 120 of the plug member 94 are fixedly coupled to an insert 148 formed of an insulative material, such as plastic. The insert 148 has a body 150 having outer and inner ends 150*a*, 150*b*, a flange 152 extending radially outward from the outer surface of the body 150 and which divides the body 150 into an outer section 154 which extends between the outer end 150*a* and the flange 152, and an inner section 156 which extends between the inner end 150*b* and the flange 152. A circumferential groove 158 is provided in the exterior surface of the inner section 156 proximate to the flange 152. A socket 160 defined by an inner wall in the body 150 extends from the outer end 150*a* to a plurality of spaced apart passageways 162 defined by inner walls through the body 150 which extend from the socket 160 to the inner end 150*b*. The fingers 120 of the plug member 94 seat within the socket 160, and the first leg 106 of the collar 104 abuts against the outer end 150*a* of the insert 148. The socket 160 has mating recesses (not shown) therein in which the projections 122 seat to fixedly couple the plug member 94 to the insert 148. Pins 164 are seated within the passageways 162 and extend into and through the passageways 118 of the plug member 94. The pins 164 extend into the socket 116 of the plug member 94.

Figure 5:
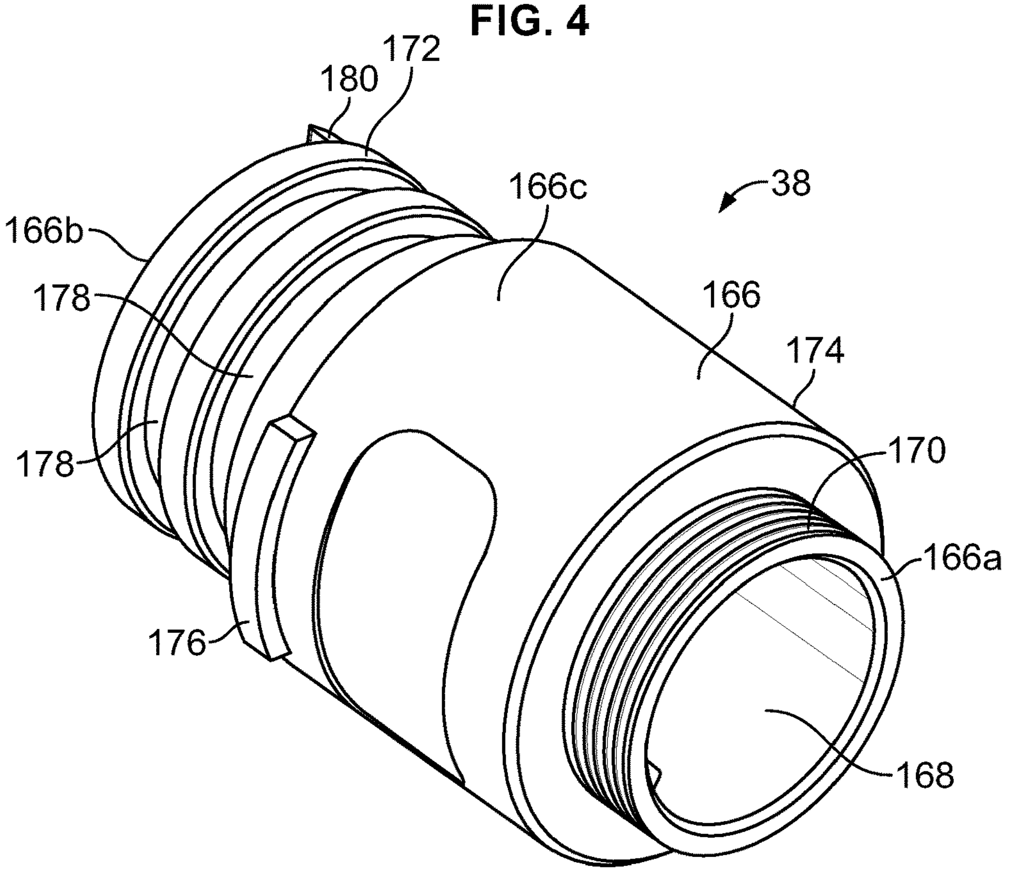
FIG. 5 is a perspective view of a second adapter of the light emitting diode lighting fixture.

The second adapter 38 is illustrated in FIG. 5. The second adapter 38 may be formed of plastic, such as polycarbonate, and includes a body 166 having outer and inner ends 166*a*, 166*b*, an outer surface 166*c*, and a central passageway 168 defined by an inner wall therethrough. The passageway 168 may be cylindrical. The body 166 includes has an outer section 170 extending from the outer end 166*a*, an inner section 172 extending from the inner end 166*b*, and an intermediate section 174 extending between the outer and inner sections 170, 172. The outer section 170 defines an outer diameter which is less than the outer diameters defined by the inner section 172 and by intermediate section 174. The inner section 172 has an outer diameter which is less than the diameter defined by the intermediate section 174. The outer surface 166*c* of the outer section 170 may be threaded. The outer surface 166*c* of the intermediate section 174 may be cylindrical, with the exception of an ear 176 that extends radially outward therefrom proximate to the inner section 172. A pair of spaced apart grooves 178 are in the outer surface 166*c* of the inner section 172 and extend circumferentially therearound. At least one projection 180, shown as two projections in the drawings, extend from the inner end 166*b* of the body 166. Sealing members 182, such as rubber O-rings, are seated within the grooves 178. The second adapter 38 is attached to the end 22*b* of the enclosure 22 to form a mechanical attachment, and may be attached by a variety of processes, such as ultrasonic welding, adhesives, threads, clamps etc., with the sealing members 182 sandwiched between the second adapter 38 and the enclosure 22. This prevents the entrance of moisture into the enclosure 22 between the joint between the second adapter 38 and the enclosure 22.

The receiving sleeve 96, the locking member 98, the sliding sleeve 100, and the locking ring 184 may be formed of metal, such as brass. The locking ring 184 may also be formed of plastic. The plug member 94 and the insert 148 may be formed of plastic.

The inner section 156 of the insert 148 is inserted into the passageway 168 of the second adapter 38 and the flange 152 of the insert abuts against the outer end 166*a* of the second adapter 38. In an embodiment, the insert 148 is attached to the second adapter 38 by a locking ring 184 which forms part of the male connector 34. The locking ring 184 has a first leg 186 which is cylindrical and a second leg 188 which extends radially inward from the first leg 186 to define a recess 190. An opening 192 is provided through the second leg 188 which is in communication with the recess 190. An interior surface of the first leg 186 may have a thread form thereon. The first leg 186 of the locking ring 184 seats over the outer section 170 of the second adapter 38 and is mated therewith. This may be done by threadedly connecting the insert 148 and the second adapter 38, or by otherwise securing the insert 148 and the second adapter 38 together. A sealing member 194 seats between the insert 148 and the second adapter 38. The flange 152 seat within the recess 190 and between the second leg 188 of the insert 148 and the outer end 166*a* of the second adapter 38. The plug member 94, the receiving sleeve 96, the locking member 98, the sliding sleeve 100 are attached to the insert 148. A sealing member 196 seats between the plug member 94 and the insert 148.

An end of a wire lead 198 extends through the passageway 168 of the second adapter 38 and is coupled to one of the pins 164, for example by screw attach welding or by crimping. An inner end of the wire lead 198 is connected to a contact pad on the substrate 30 and may be connected by soldering or welding. The second adapter 38 is attached to the end 22*b* of the enclosure 22 by inserting the outer section 172 therethrough and into the passageway 168. The ear 176 extending from the body 166 of the second adapter 38 engages the end 22*b* of the enclosure 22 to prevent the further insertion of the second adapter 38 into the enclosure 22. The sealing members 182 are sandwiched between the second adapter 38 and the enclosure 22 to prevent the entrance of moisture therebetween. Thereafter, the second adapter 38 and the enclosure 22 are permanently mated together, such as by, for example, ultrasonic welding.

The female and male connectors 32, 34 are constructed complementary to one another so that female connector 32 can be inserted into the receiving space 110 and the socket 116 to make electrical connection between the and the pins 164 so that wire lead 92, 198 are in electrical continuity with one another.

Figure 2:
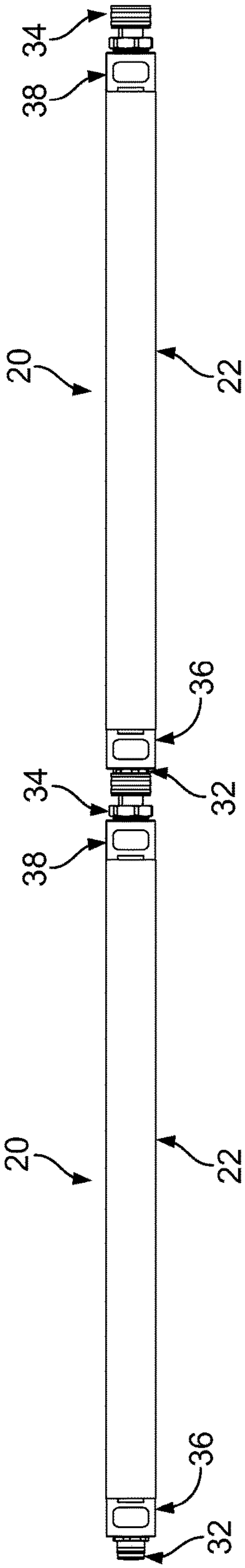
FIG. 2 depicts a side elevation view of two of the light emitting diode lighting fixtures coupled together.

As shown in FIG. 2, the LED lighting fixture 20 is intended to be coupled to another like LED lighting fixture 20 by coupling the male connector 34 of one LED lighting fixture 20 to the female connector 32 of another LED lighting fixture 20. This provides additional lighting as may be required to increase illumination. The LED lighting fixtures 20 allow for multiple LED lighting fixtures 20 to be connected together in an end-to-end arrangement, and forming a linear arrangement that is attractive. This is easily done by the operator without the use of tools since the female and male connectors 32, 34 are coupled together without the use of tools. In addition, since unsightly cables are not provided between the LED lighting fixtures 20, the attached LED lighting fixtures 20 are much more attractive. Multiple LED lighting fixtures 20 may be connected together in a linear fashion, thereby creating a modular arrangement of LED lighting fixtures 20.

With regard to the specific embodiment of the female and male connectors 32, 34 shown in the drawings, to connect the male connector 34 of the first LED lighting fixture 20 to the female connector 32 of the second LED lighting fixture 20, the terminal receiving member 44 of the first LED lighting fixture 20 is inserted into the socket of the plug member 94 of the second LED lighting fixture 20, and the receiving sleeve 46 of the first LED lighting fixture 20 is inserted into the receiving space 110 of the second LED lighting fixture 20. When the receiving sleeve 46 is inserted into the receiving space 110, the inner end 48*a* of the receiving sleeve 46 abuts against the axially inclined locking lugs 140 in their smaller opening. When the female connector 32 is inserted further into the male connector 34, the locking lugs 140 are bent and flex in a plug-in direction, that is towards the unlocking position. When the female connector 32 is fully inserted, the pins 164 seat within the terminal sleeves 52 to form the electrical connection, and the locking lugs 140 resume their unflexed shape and engage behind the forward shoulder 66 formed by the recess 64. As a result, the female connector 32 is secured by the releasable locking member 98 against retraction in the male connector 34 in a form-locked fashion. As described in U.S. Pat. No. 7,695,302 B2, the female and male connectors 32, 34 can be disengaged.

The non-connected ends of the LED lighting fixture multi-tube assembly are connected to a power source (not shown) via the non-connected ends such power is input at an outer non-connected end and exits the inner non-connected end. Similar female and male connectors are included with the power source providing a pluggable interface for the LED lighting fixture assembly. The power source may be in the form of a tube support that allows the LED lighting fixture 20 to be mounted to a structure. It is also contemplated that the pluggable power source connectors may also be part of a cable, wherein the cable is simply connected to the LED lighting fixture 20 with the LED lighting fixture 20 be mounted with an alternative structure such as clamps or a stand.

The present LED lighting fixture 20 is described as having the female connector 32 and the first adapter 36 on end 22*a* and the male connector 34 and the second adapter 38 on the end 22*b*. It is to be understood that a first LED lighting fixture 20 could have the male connector 34 and the second adapter 38 on each end, and a second LED lighting fixture 20 used in combination with the first LED lighting fixture 20 could have the female connector 32 and the first adapter 36 on at least one of the ends. In addition, a first LED lighting fixture 20 could have the female connector 32 and the first adapter 36 on each end, and a second LED lighting fixture 20 used in combination with the first LED lighting fixture 20 could have the male connector 34 and the second adapter 38 on at least one of the ends.

It will be understood that there are numerous modifications of the illustrated embodiments described above which will be readily apparent to one skilled in the art, such as many variations and modifications of the compression connector assembly and/or its components including combinations of features disclosed herein that are individually disclosed or claimed herein, explicitly including additional combinations of such features, or alternatively other types of contact array connectors. Also, there are many possible variations in the materials and configurations.

I claim:

1. An assembly comprising:

first and second light emitting diode lighting fixtures, each light emitting diode lighting fixture including a plastic enclosure having opposite ends and a passageway extending therebetween, a heat sink formed of a heat conducting material disposed in the passageway of the enclosure, and a light emitting diode array including a light emitting diode on an insulative substrate and a conductive lead extending from the light emitting diode and the insulative substrate, the light emitting diode array being mounted on the heat sink;

a plastic adapter coupled to one of the ends of each enclosure, the lead of the respective light emitting diode lighting fixture extending through the respective plastic adapter, wherein the adapters and the enclosures are separate components which are coupled together such that the ingress of moisture into the passageway of the respective enclosure through the coupling is prohibited;

a female connector coupled to the adapter of the first light emitting diode lighting fixture and electrically connected to the lead extending therethrough;

a male connector coupled to the adapter of the second light emitting diode lighting fixture and electrically connected to the lead extending therethrough, and wherein the adapters and connectors are separate components which are coupled together; and wherein the connectors are configured to directly mechanically mate without the use of tools and to provide an electrical connection therebetween.

2. The assembly of claim 1, wherein the adapters and the enclosure are formed of polycarbonate.

3. The assembly of claim 1, wherein the adapters and the enclosure are ultrasonically welded together which prevents the ingress of moisture into the passageway of the enclosure.

4. The assembly of claim 1, further comprising at least one sealing member between each adapter and the enclosure which prevents the ingress of moisture into the passageway of the enclosure.

5. The assembly of claim 1, wherein the male connector includes first and second sleeves which are slidable relative to each and a locking spring engaged with the first and second sleeves.

6. The assembly of claim 5, wherein the first sleeve and the locking spring are formed of metal.

7. The assembly of claim 1, wherein the enclosure is at least partially optically transmissive.

8. The assembly of claim 1, wherein each light emitting diode lighting fixture further includes a second connector coupled to the other of the ends of the enclosure, wherein the second connector of the first light emitting diode lighting fixture is a male connector and the second connector of the second light emitting diode lighting fixture is a female connector, the light emitting diode array of the first light emitting diode lighting fixture being electrically connected to the male connector of the first light emitting diode lighting fixture, the light emitting diode array of the second light emitting diode lighting fixture being electrically connected to the female connector of the second light emitting diode lighting fixture, and wherein the male connector of the first connector is configured to directly mechanically mate with the female connector of the second connector without the use of tools and to provide an electrical connection therebetween.

9. A light emitting diode lighting fixture comprising:

an enclosure;

a heat sink disposed in the enclosure;

a light emitting diode array mounted on the heat sink;

a first adapter secured to a first end of the enclosure, wherein the first adapter and the enclosure are formed of the same material and are affixed together;

a first sealing member positioned between the first adapter and the enclosure;

a first connector secured to the first adapter;

a second adapter secured to a second end of the enclosure, wherein the second adapter and the enclosure are formed of the same material and are affixed together;

a second sealing member positioned between the second adapter and the enclosure; and a second connector secured to the second adapter, wherein each connector is one of a female connector and a male connector.

10. The light emitting diode lighting fixture of claim 9, wherein the adapters and the enclosure are formed of polycarbonate.

11. The light emitting diode lighting fixture of claim 9, wherein the adapters and the enclosure are ultrasonically welded together.

12. The light emitting diode lighting fixture of claim 9, wherein the light emitting diode array includes a circuit board and a plurality of light emitting diodes electrically connected to the circuit board.

13. The light emitting diode lighting fixture of claim 12, wherein the enclosure is at least partially optically transmissive.

14. The assembly of claim 1, further comprising at least one sealing member between each adapter and the enclosure and the adapters and the enclosure are ultrasonically welded together to prevent the ingress of moisture into the passageway of the enclosure.

15. The assembly of claim 1, wherein each light emitting diode lighting fixture further includes a second connector coupled to the second end of the enclosure of the respective light emitting diode lighting fixture, wherein each second connector is one of a female connector and a male connector.

16. The assembly of claim 15, wherein each second connector is coupled to the respective light emitting diode lighting fixture by a plastic adapter, each adapter which couples the second connector to the respective light emitting diode lighting fixture is coupled thereto such that the ingress of moisture into the passageway of the enclosure of the respective light emitting diode lighting fixture is prohibited.

17. The assembly of claim 1, wherein the adapter of the first light emitting diode lighting fixture and the female connector are coupled together by a threaded connection.

18. The assembly of claim 1, wherein the adapter of the second light emitting diode lighting fixture and the male connector are coupled together by a threaded connection.

19. The assembly of claim 1, wherein the adapter of the first light emitting diode lighting fixture and the female connector are coupled together by a threaded connection, and the adapter of the second light emitting diode lighting fixture and the male connector are coupled together a threaded connection.

20. The assembly of claim 1, further comprising a second plastic adapter coupled to the other end of each enclosure, a lead of the respective light emitting diode lighting fixture extending through the respective second plastic adapter, and wherein the second adapters and the respective enclosure are separate components which are coupled together such that the ingress of moisture into the passageway of the respective enclosure through the coupling is prohibited.

* * * * *